United States Patent Office 3,776,948
Patented Dec. 4, 1973

3,776,948
PROCESS FOR THE PRODUCTION OF
MONOACETIN AND GLYCERINE
Axel Kleemann, Oberursel, Gerd Schreyer, Grossauheim, Otto Weiberg, Neu-Isenburg, and Wolfgang Weigert, Offenbach (Main), Germany, assignors to Deutsche Gold- und Silber-Scheideanstalt vormals Roessler, Frankfurt am Main, Germany
No Drawing. Filed Aug. 7, 1970, Ser. No. 62,182
Claims priority, application Germany, Aug. 30, 1969, P 19 44 120.4
Int. Cl. C07c 29/02, 67/00
U.S. Cl. 260—491            9 Claims

ABSTRACT OF THE DISCLOSURE

Glycerine is produced by reacting allyl acetate with aqueous peracetic acid. The monoacetin formed is converted to glycerine by alcoholysis or aqueous saponification after removal of unreacted allyl acetate, acetic acid and water.

The present invention is directed to a process of producing glycerine from allyl acetate and aqueous peracetic acid.

It is known, according to French Pat. 1,509,278 and German Pat. 1,222,028, to obtain synthetic glycerine by the reaction of allyl alcohol with acetic acid containing peracetic acid in very dilute aqueous solution. The molar proportion of peracetic acid to water in the reaction mixture at the beginning of the reaction should lie between 1:20–70. In such procedures there is first formed glycide which is hydrolyzed to glycerine with a large excess of water. There are also described processes in which alkyl alcohol in very dilute aqueous solution is epoxidized or hydroxylated with hydrogen peroxide in the presence of tungstic acid or its derivatives as catalysts (for example see German Pat. 1,212,056). These processes, however, have a number of disadvantages. Thus, there is formed in the course of the epoxidation from glycide and excess allyl alcohol noteworthy amounts of glycerine allyl ether and in the hydrolysis of the glycide di- and polyglycerine as undesired byproducts. The presence of these materials considerably increases the difficulty of obtaining pure glycerine. In the use of hydrogen peroxide for the epoxidation or hydroxylation considerable difficulties are caused by the quantitative recovery of pure tungstate contact catalyst. Besides there is always formed as a byproduct acrolein which is capable of yield reducing secondary reactions. All of these byproducts are formed from the bifunctional very reactive glycide.

It has now been found that in the reaction of allyl acetate with peracetic acid in the presence of a small amount of water, and, in a given case, in the presence of acetic acid there is formed mainly monoacetin besides small amounts of di- and triacetin, which after separation of unreacted allyl acetate, acetic acid and water can be converted to glycerine in known manner by alcoholysis or aqueous saponification.

Consequently there results in an unexpected manner under the conditions employed a hydroxylation of allyl acetate which proceeds by way of glycide acetate according to the reaction scheme.

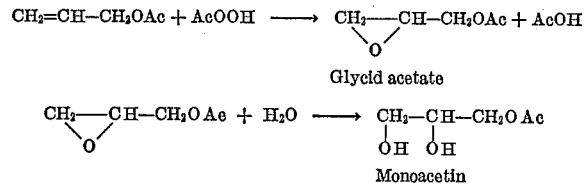

Glycid acetate

Monoacetin

The formation of monoacetin from the epoxide compound occurs already for the most part in the course of the epoxidation and can be completed by a further short heating of the reaction mixture.

After separation in known manner of unreacted allyl acetate, acetic acid and water the monoacetin as well as accompanying di- and triacetin can be converted (as already set forth) to glycerine either by alcoholysis with a suitable alcohol according to the equation.

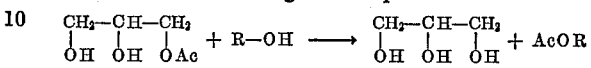

or by aqueous saponification. The acetic acid ester formed by the alcoholysis can be changed again into acetic acid and alcohol according to known procedures and these products returned to the process. In the aqueous saponification there is formed acetic acid which can be separated in known manner, for example by extraction with a suitable solvent (e.g. ethyl acetate).

The epoxidation or hydroxylation of the allyl acetate in the presence of acetic acid takes place at elevated temperatures beginning at 30° C., preferably between 40 and 90° C. with a pure aqueous solution of peracetic acid, as results, for example, in its production from hydrogen peroxide and acetic acid according to German Pat. 1,165,567 or Weiberg U.S. Pat. 3,264,346. The use of higher temperatures is not recommended since in such case there occurs larger active oxygen losses through thermal decomposition of the peracetic acid. The reaction can also be carried out at lower temperatures. However, from commercial considerations temperatures beginning at 40° C. are employed as otherwise the reaction times are too long.

In place of an aqueous peracetic acid there can also be used a solution of peracetic acid in acetic acid. However, in such case the amount of water added must be such that the molar properties of peracetic acid to water lies between 1:1 and 1:10.

In order to shorten the reaction time the olefinic component is added in excess. The best yields are obtained at a molar ratio of allyl acetate:peracetic acid from 1.5:1 to 5.0:1. However, the molar ratio can be varied within any desired boundaries. For quick progress of the hydroxylation the presence of acetic acid is necessary for reasons not yet well understood. However, for the reaction as such the acetic acid is not absolutely necessary.

The molar proportions of acetic acid:peracetic acid can be within the range of 0.5–10:1, preferably between 2.0 and 6.0:1. The reaction times are very strongly dependent on the temperatures used and amount to 2 to 20 hours. At 60° C. it is calculated that a reaction time of 3–8 hours is required for complete peracetic acid conversion.

If the reaction mixture still contains small amounts of glycidyl acetate after complete reaction of the peracetic acid, this is converted to monoacetin by a brief heating at 80–110° C. The monoacetin is relatively pure and can in a given case also be isolated as such.

If it is desired to convert the monoacetin, as well as the accompanying di- and triacetin to glycerine, after separation of excess allyl acetate, acetic acid and water, alcoholysis is accomplished by the addition of any desired saturated or unsaturated aliphatic or alicyclic alcohol, in excess, e.g., 1.5 to 20 mols per mol of monoacetin. Examples of such alcohols are methyl alcohol, ethyl alcohol, isopropyl alcohol, propyl alcohol, butyl alcohol, sec. butyl alcohol, t-butyl alcohol, amyl alcohol, hexyl alcohol, octyl alcohol, 2-ethylhexyl alcohol, decyl alcohol, cyclohexanol, cyclopentanol, allyl alcohol, crotyl alcohol, ethylene glycol, propylene glycol, etc. The use of methanol has proven advantageous since the reaction takes place very smoothly and because of its lower boiling point is also sparing in materials. The alcoholysis proceeds almost quantitatively and without side reactions with almost all known transesterification catalyst such as inorganic acids and bases, metal alcoholates, acidic, basic and neutral salts, for example, sulfuric acid, hydrochloric acid, phosphoric acid, sodium hydroxide, potassium hydroxides, sodium carbonate, p-toluene sulfonic acid, benzene sulfonic acid, triethyl amine, dimethylaniline, sodium methylate, sodium ethylate, potassium acid sulfate as well as cation exchange and anion exchangers.

The catalyst is usually employed in an amount of 0.1 to 10% of the monoacetin but the exact amount is not critical. The methyl acetate arising in the course of the reaction advantageously is constantly distilled off from the reaction mixture as an azeotrope with methanol over a suitable column. After separation of the catalyst by filtration of ion exchange and the excess methanol, for example in a thin layer evaporator, there is obtained a pure, anhydrous glycerine, that can be rectified in vacuum for the highest purity requirements. The methyl acetate formed can be hydrolyzed in known manner to methyl alcohol and acetic acid and again supplied to the process.

Alternatively to alcoholysis the monoacetin can be hydrolyzed to glycerine with water at higher temperatures, e.g. 60 to 150° C. in the presence of acidic or basic catalysts such as those set forth above, e.g. sulfuric acid, acid ion exchangers, sodium hydroxide and basic ion exchangers. If the hydrolysis is carried out at temperatures of 110°–200° C. under pressure, e.g. in an autoclave the presence of acidic or basic catalysts is not absolutely necessary.

The technical advance of the process of the invention is first the possibility of immediately obtaining a relatively pure monoacetin in a one-step process which can be freed of excess reactants as well as reaction media and byproducts by known methods. Furthermore the monoacetin so obtained can be changed into glycerine of high purity in good yields with scarcely any byproducts such as polyglycerine since the allyl acetate does not tend to undergo side reactions because it does not have free hydroxyl groups and furthermore can be employed in any desired excess. Additionally the intermediately formed glycidyl acetate is less susceptible to side reactions than glycide. Besides no catalysts are necessary for the hydroxylation and accordingly no special precautions are required for their separation and recovery. The reaction of allyl acetate with peracetic acid proceeds much less violently than that of allyl alcohol and therefore can be carried out very well industrially with safety. Furthermore, as has been pointed out higher concentrations can be used without the formation of yield reducing byproducts. The process can be carried out batchwise or continuously.

The invention will be illustrated by the following examples.

Unless otherwise indicated all parts and percentages are by weight.

EXAMPLE 1

Inside one hour there was added 2.0 mols of peracetic acid as a 54.7% aqueous solution (278 grams) at 60° C. to a mixture of 6.0 mols of allyl acetate and 5.0 mols of acetic acid. After 6 hours at 60° C. the peracetic acid was completely reacted. Then excess allyl acetate as well as water and acetic acid were distilled off in a vacuum from the reaction mixture which contained no epoxide compounds, and the residue which consisted preponderantly of monoacetin was treated with 15 mols of methanol and 0.2 weight percent of p-toluene sulfonic acid and in the course of 2 hours transesterified. The methyl acetate formed in the transesterification was continuously removed from the reaction mixture by distilling as an azeotrope with methanol over a suitable column (B.P. 53.5° C., 19% methanol). After the reaction the catalyst was removed from the reaction mixture with a basic ion exchanger and the methanol volatilized. Through distillation of the residue in a vacuum there were obtained 162 grams of pure glycerine, which corresponds to a yield of 88% of theory based on the peracetic acid added.

EXAMPLE 2

A mixture of 7.0 mols of allyl acetate and 5.0 mols of acetic acid were reacted within 1 hour at 65° C. with 2.0 mols of peracetic acid in the form of a 56.9% aqueous solution (267 grams). After 4 hours at 65° C. the reaction of the peracetic acid and the formation of monoacetin was finished. The reaction mixture was worked up and transesterified as in Example 1. There were obtained 154 grams of pure glycerine, corresponding to a yield of 83.8% of theory based on the peracetic acid added.

EXAMPLE 3

8 mols of allyl acetate were reacted within one hour at 65° C. with 2.0 mols of peracetic acid in the form of a 54.45% aqueous solution (279.5 grams). After a further 16 hours at 65° C. the mixture was free of peracetic acid and epoxide and was worked up and transesterified as in Example 1. There were obtained 151 grams of pure glycerine. This corresponded to a yield of 82.1% of theory based on the peracetic acid added.

EXAMPLE 4

There were added at 50° C. within 45 minutes 2.0 mols of peracetic acid in the form of a 53.2% aqueous solution to a mixture of 8.0 mols of allyl acetate and 6.7 mols of acetic acid. After 7 hours at 50° C. the peracetic acid was completely reacted and the reaction mixture still contained 10 mol percent of glycidyl acetate which was converted to monoacetin by a further heating for one hour at 80° C. After working up and transesterification as in Example 1 there were obtained 158.3 grams of pure glycerine, corresponding to a yield of 86.0% of theory based on the peracetic acid.

EXAMPLE 5

A mixture of 6.0 mols of allyl acetate and 5.0 mols of acetic acid were reacted within 1 hour at 70° C. with 2.0 mols of peracetic acid in the form of a 54.45% aqueous solution (279.5 grams). After 2 more hours at 70° C. the mixture was heated for 1 hour at 85° C. whereupon the reaction was completed. After working up and transesterification as in Example 1 there were obtained 152.5 grams of pure glycerine. This corresponded to a yield of 82.9% of theory based on the peracetic acid added.

EXAMPLE 6

The procedure of Example 5 was repeated and after separation of the excess allyl acetate, water and acetic acid the monoacetin obtained was reacted with 1,200 grams of water and heated in an autoclave for 30 minutes at 180°. There were obtained 146 grams of glycerine as a 9.9% aqueous solution. This corresponded to a yield of 79.4% of theory based on the peracetic acid added.

EXAMPLE 7

The procedure of Example 5 was repeated and after separation of the excess allyl acetate, water and acetic acid the monoacetin obtained was reacted with 1,200 grams of water and 50 ml. of a strongly acid cation exchanger (sulfonated polystyrene cross linked with divinylbenzene) and heated at reflux for 1 hour. After separation of the cation exchanger there were obtained 143 grams of glycerine as a 9.74% aqueous solution. The glycerine yield was 77.7% of theory based on the peracetic acid added.

What is claimed is:

1. A process for producing monoacetin consisting of heating allyl acetate with peracetic acid at a temperature of 30° C. to 90° C. in the presence of (1) water or (2) water and acetic acid, the molar ratio of peracetic acid to water being from 1:1 to 1:10.

2. A process according to claim 1 wherein acetic acid is present initially.

3. A process according to claim 2 wherein the temperature is 40 to 90° C., the molar ratio of peracetic acid to acetic acid is 1:2.0 to 1:6.0; and the molar ratio of allyl acetate to peracetic acid is from 1.5 to 5.0:1.

4. A process according to claim 3 including the further step of converting the monoacetin to glycerine by either alcoholysis or hydrolysis.

5. A process according to claim 4 wherein the glycerine is formed by alcoholysis of the monoacetin with methanol.

6. A process according to claim 1 consisting of heating allyl acetate with peracetic acid at a temperature of 30° C. to 90° C. in the presence of water, the molar ratio of peracetic acid to water being from 1:1 to 1:10.

7. A process according to claim 6 wherein the temperature is 40 to 90° C. and the molar ratio of allyl acetate to peracetic acid is from 1.5 to 5.0:1.

8. A process according to claim 7 including the further step of converting the monoacetin to glycerine by either alcoholysis or hydrolysis.

9. A process according to claim 1 wherein acetic acid is present initially, the molar ratio of acetic acid to peracetic acid being from 0.5:1 to 10:1.

References Cited

UNITED STATES PATENTS

| | | | |
|---|---|---|---|
| 2,500,599 | 3/1950 | Bergsteinsson et al. | 260—488 J |
| 2,739,173 | 3/1956 | Carey et al. | 260—635 H |
| 2,373,942 | 4/1945 | Bergsteinsson | 260—635 H |
| 2,813,910 | 11/1957 | Tjepkema | 260—491 |
| 2,492,201 | 12/1949 | Swern et al. | 260—635 H |
| 2,776,301 | 1/1957 | Payne et al. | 260—635 H |
| 3,454,655 | 7/1969 | Liao et al. | 260—635 H |
| 3,609,198 | 9/1971 | Yamagishi | 260—635 H |
| 2,911,437 | 11/1959 | Keith | 260—491 |
| 3,517,054 | 6/1970 | Ketley | 260—491 |

OTHER REFERENCES

Chemistry of Carboxylic Acids and Esters, Interscience Publications, 1969, pp. 670–671.

VIVIAN GARNER, Primary Examiner

U.S. Cl. X.R.

260—502 R, 615 R, 635 H